United States Patent
Mentovich et al.

(10) Patent No.: US 10,394,060 B2
(45) Date of Patent: Aug. 27, 2019

(54) OPTICAL TESTING OF FK MODULATORS FOR SILICON PHOTONICS APPLICATIONS

(71) Applicant: Mellanox Technologies, Ltd., Yokneam (IL)

(72) Inventors: Elad Mentovich, Tel Aviv (IL); Sylvie Rockman, Zichron Yaakov (IL); Jacob Levy, Sierra Madre, CA (US); Shai Cohen, Haifa (IL)

(73) Assignee: Mellanox Technologies, Ltd., Yokneam (IL)

(*) Notice: Subject to any disclaimer, the term of this patent is extended or adjusted under 35 U.S.C. 154(b) by 0 days.

(21) Appl. No.: 15/597,835

(22) Filed: May 17, 2017

(65) Prior Publication Data

US 2018/0335653 A1 Nov. 22, 2018

(51) Int. Cl.
| | |
|---|---|
| *G02F 1/25* | (2006.01) |
| *G02F 1/025* | (2006.01) |
| *G01M 11/00* | (2006.01) |
| *G02B 6/00* | (2006.01) |
| *G02F 1/015* | (2006.01) |

(52) U.S. Cl.
CPC ............ *G02F 1/025* (2013.01); *G01M 11/00* (2013.01); *G02F 2001/0157* (2013.01)

(58) Field of Classification Search
CPC .................................... G02B 6/00; G02F 1/25
USPC ........................................................... 385/3
See application file for complete search history.

(56) References Cited

U.S. PATENT DOCUMENTS

| | | | | |
|---|---|---|---|---|
| 3,840,738 A | * | 10/1974 | Indig | H04B 10/2513 359/566 |
| 5,625,729 A | * | 4/1997 | Brown | G02B 6/34 359/573 |
| 7,408,693 B2 | * | 8/2008 | Kissa | G02F 1/0123 359/245 |
| 7,720,116 B2 | * | 5/2010 | Anderson | H01S 5/143 372/20 |
| 7,860,358 B2 | * | 12/2010 | Tsuda | G02F 1/3132 385/16 |
| 7,995,877 B1 | * | 8/2011 | Skogen | B82Y 20/00 385/14 |
| 8,014,639 B1 | * | 9/2011 | Skogen | B82Y 20/00 385/14 |

(Continued)

OTHER PUBLICATIONS

Chaisakul et al. "Recent progress in GeSi electro-absorption modulators." National Institute for Materials Science; Science and Tehcnology of Advanced Materials, vol. 15, 2014, 9 pages.

(Continued)

*Primary Examiner* — Kaveh C Kianni
(74) *Attorney, Agent, or Firm* — Alston & Bird LLP (57) ABSTRACT

An method for characterizing a modulator for fabricating a silicon photonics circuit and an apparatus (e.g., a silicon photonics wafer) made via the method are described. The method includes determining an absorption spectrum of a modulator and determining, based at least on the determined absorption spectrum, an operational bandwidth of the modulator. The method further includes selecting a laser for coupling with the modulator using the operational bandwidth of the modulator. In this way, the laser is selected such that it has an emission bandwidth that corresponds to the operational bandwidth of the modulator.

9 Claims, 10 Drawing Sheets

(56) References Cited

U.S. PATENT DOCUMENTS

| | | | | |
|---|---|---|---|---|
| 8,644,648 | B2* | 2/2014 | Ho | G02F 1/065 |
| | | | | 385/2 |
| 9,568,752 | B2* | 2/2017 | Ho | G02F 1/025 |
| 9,823,497 | B1* | 11/2017 | Skogen | G02F 1/01708 |
| 2003/0161022 | A1* | 8/2003 | Lazarev | G02F 1/035 |
| | | | | 359/245 |
| 2005/0129077 | A1* | 6/2005 | Lundqvist | H01S 5/0265 |
| | | | | 372/50.1 |
| 2010/0290790 | A1* | 11/2010 | Murthy | H04B 10/506 |
| | | | | 398/192 |
| 2011/0051763 | A1* | 3/2011 | Vanier | G04F 5/145 |
| | | | | 372/38.02 |
| 2012/0044489 | A1* | 2/2012 | Chakravarty | B82Y 20/00 |
| | | | | 356/326 |
| 2012/0281221 | A1* | 11/2012 | Studer | G01J 3/02 |
| | | | | 356/437 |
| 2012/0321240 | A1* | 12/2012 | Alloatti | G02F 1/025 |
| | | | | 385/2 |
| 2014/0010498 | A1* | 1/2014 | Verslegers | G02B 5/1861 |
| | | | | 385/37 |
| 2014/0056551 | A1* | 2/2014 | Liu | G02F 1/025 |
| | | | | 385/2 |
| 2014/0329050 | A1* | 11/2014 | Gu | G02B 6/1225 |
| | | | | 428/135 |
| 2016/0109731 | A1* | 4/2016 | Huang | G02F 1/015 |
| | | | | 385/3 |

OTHER PUBLICATIONS

Feng et al. "High-Speed GeSi Electroabsorption Modulator on the SOI Waveguide Platform." IEEE Journal of Selected Topics in Quantum Electronics, vol. 19, No. 6, Nov./Dec. 2013, 10 pages.

* cited by examiner

FIG. 9

OPTICAL TESTING OF FK MODULATORS FOR SILICON PHOTONICS APPLICATIONS

BACKGROUND

The present disclosure relates in general to methods of optical testing for silicon photonics during manufacturing of silicon photonics wafers and silicon photonics wafers manufactured using such methods.

Modulators are used in optical systems to modulate a beam of light that is carried over an optical fiber. The properties of the material that are used to modulate the light beam can be selected such that the modulator is an absorptive modulator (in which the absorption coefficient of the material is changed) or a refractive modulator (in which the refractive index of the material is changed).

A laser, such as a vertical-cavity surface-emitting laser (VCSEL), may be used as the source of the beam of light in some types of optoelectronic transducers. The light from the laser may be transmitted through the modulator for modulating the optical signal as it is transmitted through the optical fiber.

BRIEF SUMMARY

Through hard work and ingenuity, the inventors have discovered that the appropriate selection of a particular laser for coupling to a particular modulator has a great effect on minimizing the losses generally experienced in conventional modulators used in silicon photonics. Embodiments of the invention described herein therefore provide improved methods for determining the particular material quality, material properties, compressive strength, and/or absorption spectrum of the modulator at the wafer level manufacturing stage and using this data to select a particular laser for coupling to the modulator. In this way, the selected laser can operate using an emission bandwidth that corresponds to an operational bandwidth of the modulator, providing optimal results. Moreover, characterization of the modulator in terms of operational bandwidth and composition can inform both the manufacturing parameters of the silicon photonics wafer, as well as the operating parameters of the laser-modulator combination, thereby avoiding undue stresses on the modulator and minimizing losses during operation.

Accordingly, in some embodiments, a method of characterizing a modulator for fabricating a silicon photonics circuit is provided, where the method includes determining an absorption spectrum of a modulator; determining, based at least on the determined absorption spectrum, an operational bandwidth of the modulator; and selecting a laser for coupling with the modulator using the operational bandwidth of the modulator. The selected laser has an emission bandwidth that corresponds to the operational bandwidth of the modulator.

In some cases, determining the absorption spectrum of the modulator may comprise using optical spectroscopy and photoluminescence. Moreover, determining the absorption spectrum of the modulator may comprise using Raman spectroscopy, where the absorption spectrum is determined by analyzing an intensity at a peak of a scan of the modulator material obtained using Raman spectroscopy. The method may further comprise determining a compressive stress of the modulator, where the compressive stress is determined by analyzing a width of a peak of the scan of the modulator material obtained using Raman spectroscopy. Selecting the laser for coupling with the modulator may comprise selecting a laser compatible with the determined compressive stress of the modulator. In some cases, the method may further comprise determining a quality of the modulator material and material properties of the modulator based on the scan obtained using Raman spectroscopy, where selecting the laser for coupling with the modulator comprises selecting a laser compatible with the quality of the modulator material and the material properties of the modulator.

In some embodiments, the modulator may be an electro-absorption (EA) modulator. The modulator material may comprise germanium silicon. Furthermore, in some cases, the method may be performed during fabrication of a silicon photonics wafer.

In other embodiments, an apparatus is provided that comprises a printed circuit board assembly; a laser configured to emit an optical signal in response to receiving an electrical signal, where the optical signal is configured to be transmitted through a fiber optic cable; and a modulator configured to modulate the optical signal, where the laser is coupled to the modulator. The laser may be selected to have an emission bandwidth that corresponds to an operational bandwidth of the modulator, where the operational bandwidth is determined based on an absorption spectrum of the modulator.

In some cases, the laser may comprise a vertical-cavity surface-emitting laser (VCSEL). The absorption spectrum of the modulator may be determined using optical spectroscopy and photoluminescence.

The absorption spectrum of the modulator may be determined via Raman spectroscopy by analyzing an intensity at a peak of a scan of the modulator material obtained using Raman spectroscopy. The selected laser may be compatible with a compressive stress of the modulator, where the compressive stress of the modulator is determined by analyzing a width of a peak of a scan of the modulator material obtained using Raman spectroscopy.

In some cases, the selected laser may be compatible with a quality of the modulator material and material properties of the modulator. The modulator may be an electro-absorption (EA) modulator. In some embodiments, the modulator may be a Franz-Keldysh (FK) modulator. Moreover, the modulator material may comprise germanium silicon. The apparatus may comprise a silicon photonics wafer.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Increasing network bandwidth requirements have led to the rise of silicon photonics for optical systems. As such, the use of silicon modulators in optical systems to modulate light emitted from a laser, such as a VCSEL, has also increased.

Figure 1:
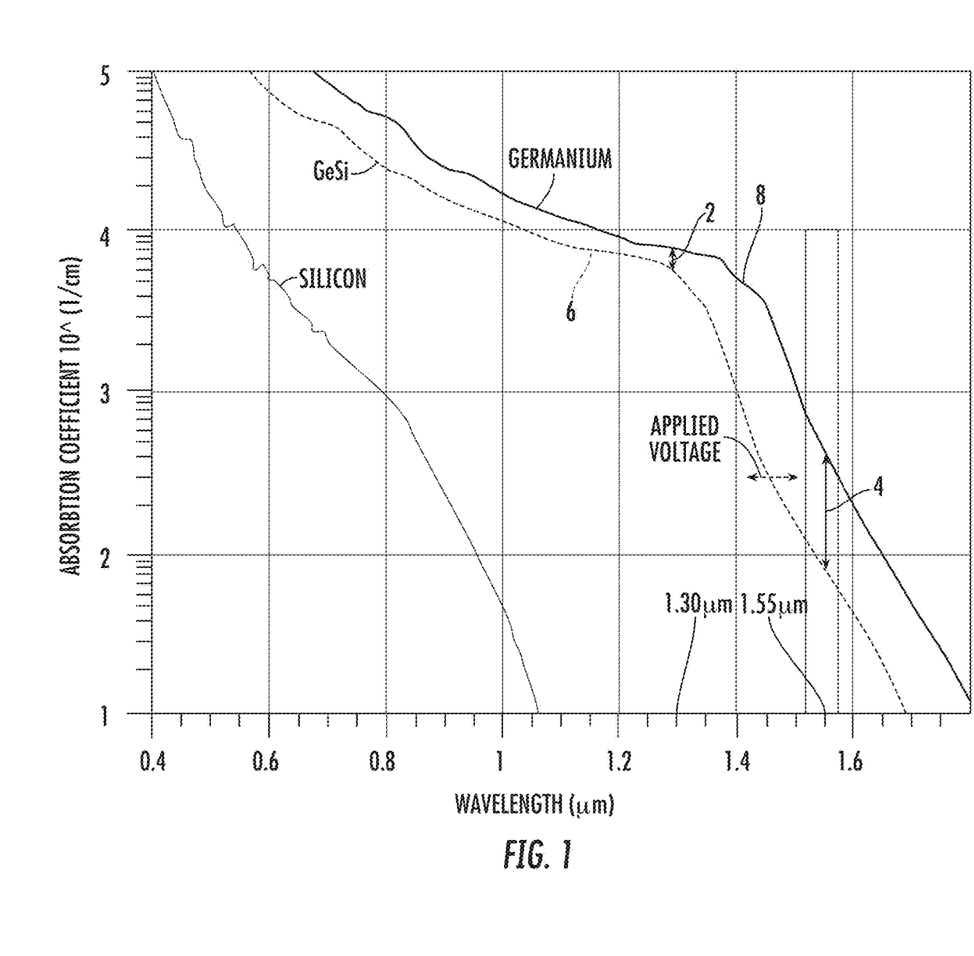
FIG. 1 illustrates the absorption coefficient of a GeSi modulator at an applied voltage versus different absorption wavelengths according to an example embodiment.

Electro-absorption (EA) modulators are considered by some to be the "next generation" in high optical bandwidth electro-optical modulators. An EA modulator is a semiconductor device that modulates the intensity of a laser beam via an electric voltage. EA modulators may make use of the Franz-Keldysh effect, which describes the phenomenon in which an applied electric field changes the absorption spectrum, which changes the bandgap edge of the modulator material. With reference to FIG. 1, for example, the absorption coefficient (x-axis) of a GeSi modulator at an applied voltage is plotted at different absorption wavelengths (y-axis). At absorption wavelengths of 1.3 µm and 1.55 µm, which are considered optimal wavelengths for transmission through single mode fiber (SMF), for example, this change in the bandgap edge (the change in the absorption coefficient of the material) is illustrated by the vertical distance 2, 4 between the applied voltage line 6 and the Germanium line 8.

In some cases, a modulator can be used which takes the form of a ring modulator, or a ring resonator. An optical ring resonator may be thought of as a set of waveguides in which at least one is a closed loop coupled to some sort of light input and output. Ring resonators operate using the properties of constructive interference and total internal reflection. When light of the resonant wavelength is passed through the loop from the input waveguide, it builds up in intensity as it goes around due to constructive interference.

One of the limitations for implementing EA modulators, as well ring resonators, is the need to fit the emission wavelength of the laser to the absorption bandwidth of the modulator. For ring resonators, for example, the typical absorption wavelength range can be 1-5 nm. For EA modulators, as another example, the typical absorption wavelength range can be 3-50 nm. The particular range of wavelengths that make up the absorption wavelength of a given modulator depends on the composition of the modulator and the inherent stress within the modulator (e.g., the compressive stress created by the layers of material surrounding the basic structure of the modulator).

In conventional silicon photonics manufacturing processes, lasers are selected and matched with modulators based on indirect correlations between the electrical properties of the modulator and its optical properties. In such cases, the optical properties of a modulator can be inferred based on the results of electrical testing conducted on the particular modulator, and the particular laser may be selected based on the inferred optical properties. In other conventional cases, final optical testing may be conducted on the combined laser-modulator system to determine how the pair operates together.

In conventional cases in which the optical properties are inferred based on the results of electrical testing on the modulator, the tests are often not accurate enough to provide good data from which an accurate assessment of the optical properties can be made, and, as such, the selected laser may not be optimally suited for operation with the modulator due to a mismatch between the emission wavelength range of the laser and the absorption wavelength range of the modulator. In conventional cases in which the laser and the modulator are coupled to each other and provided on the finished wafer in final form prior to being optically tested, results indicating that the emission wavelength range of the laser does not correspond to the absorption wavelength range of the modulator may require re-fabrication of the wafer, such as to remove the sub-optimal laser and select a different laser for coupling to the modulator and re-testing, which may result in yield losses.

According, through applied ingenuity and hard work the inventors have invented a novel, non-obvious, and useful process that allows the manufacturer of the wafer to characterize the absorption wavelength spectrum of the modulator locally, at the wafer level, such that a laser having the appropriate emission wavelength spectrum can be selected for that particular modulator. In addition, other properties of the modulator, including its compressive stress, its composition (e.g., material quality), and its material properties (e.g., cleanliness of the material, growth parameters), may be determined at the wafer level and may in turn provide a more accurate basis and framework for selection of the laser.

Figure 2:
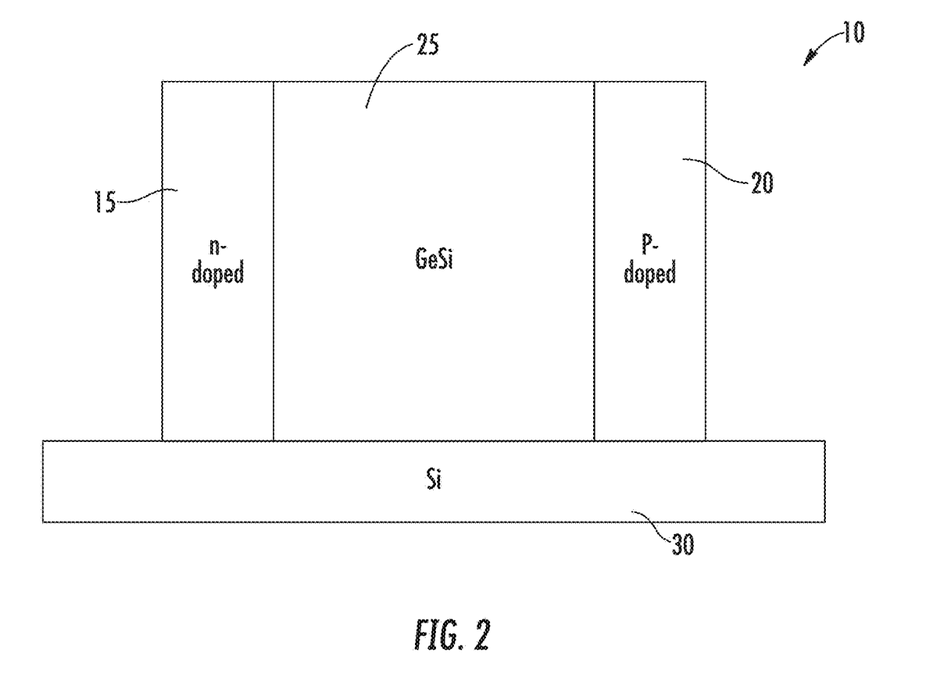
FIG. 2 is a schematic side view illustration of a germanium silicon modulator according to an example embodiment.

Accordingly, embodiments of a method for characterizing a modulator for the fabrication of a silicon photonics circuit are provided, as described below and in reference to the accompanying figures. Embodiments of the method comprise determining an absorption spectrum of a modulator. The modulator may be, in some examples, an EA modulator. In some embodiments, for example, the modulator may be a germanium silicon (GeSi) modulator, such as the modulator 10 shown in FIG. 2. The structure of the GeSi modulator 10 may, for example, include n-doped and p-doped material 15, 20 on either side of the GeSi material 25, and the modulator 10 may be formed on a silicon substrate 30 (e.g., the wafer) as shown in FIG. 2. In this way a p-i-n junction is formed, where the p-i-n junction consists of the three differently doped regions—the p-doped region 20, the intrinsic, undoped region of GeSi material 25, and the n-doped region 15. As the light propagates from the ridge silicon-on-insulator (SOI) waveguide to the FK modulator region (e.g., the modulator 10), the light is absorbed in the active GeSi region 25. The amount of absorption depends on the applied voltage across the p-i-n junction. An example of a GeSi modulator 10 is described in greater detail in Martin et al., "Technical Challenges for 100 Gb/s Silicon Photonics Transceivers for Data Center Applications," which is incorporated herein by reference in its entirety. See also Feng et al., "High-speed GeSi EA modulator at 1550 nm," which is also incorporated herein by reference in its entirety.

Figure 3:
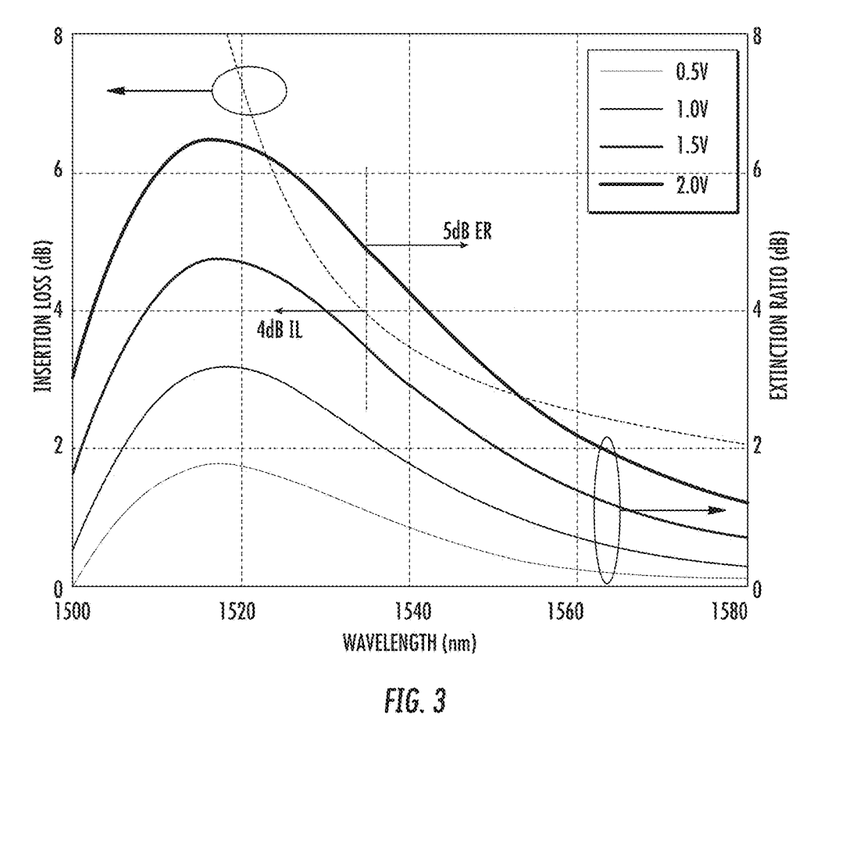
FIG. 3 illustrates insertion loss (dB) of a modulator plotted at different wavelengths of light from 1500 nm to 1580 nm according to an example embodiment.

The absorption spectrum of a modulator can be directly correlated to the operational bandwidth of the modulator. In this regard, the operational bandwidth may be a range of wavelengths that corresponds to the wavelength range over which that the power penalty for the particular modulator is minimized. The power penalty may be the loss experienced due to a combination of absorption and extinction due to the FK effect, as described below. Thus, the operational bandwidth may be considered to be the range of bandwidths based on optical frequency limitations on performance of the modulator (as opposed to, for example, radio frequency limitations on modulation speed). With reference to FIG. 3, for example, the insertion loss (dB) is plotted at different wavelengths of light from 1500 nm to 1580 nm. At the same time, the extinction ratio (dB) at different applied voltages from 0.5 V to 2.0 V is plotted over the range of wavelengths from 1500 nm to 1580 nm. As shown, at an operating wavelength of 1530 nm, the insertion loss is 4 dB, while the extinction ratio is 5 dB at a voltage of 2.0V.

Figure 4:
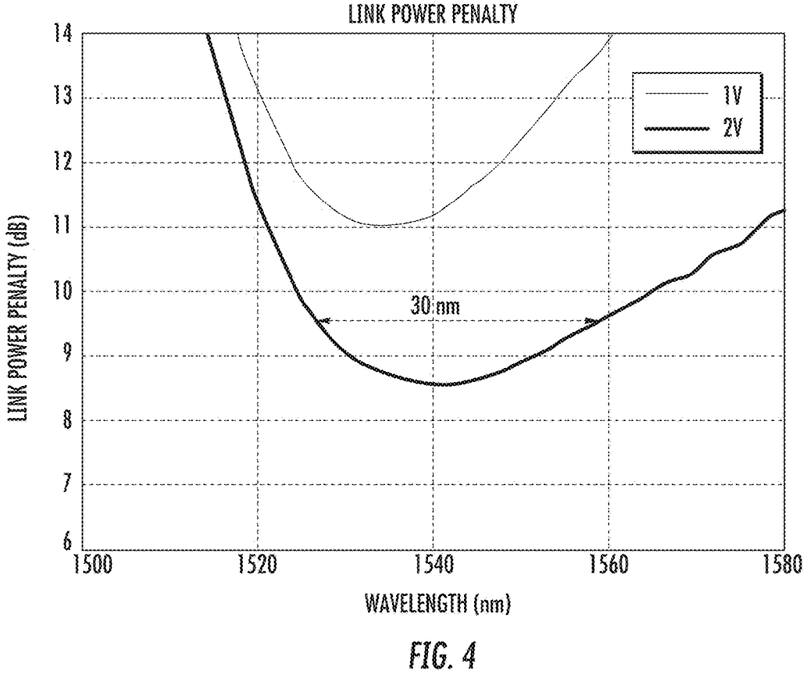
FIG. 4 illustrates the link power penalty curve of a modulator at an applied voltage according to an example embodiment.

Considered from the perspective of the link power penalty of the modulator, which includes device insertion loss, modulation optical power loss, and penalty due to limited extinctions, embodiments of the present invention therefore aim to determine a range of wavelengths corresponding to the trough of the link power penalty curve at the applied voltage, as shown in FIG. 4. The link power penalty of a modulator may be calculated as follows:

$$OMA/(2P_{in})=(P_{out}(1)-P_{out}(0))/(2P_{in}).$$

In this equation, OMA is the optical modulation amplitude, $P_{in}$ is the modulator optical input power, $P_{out}(1)$ is the high level of modulator output power, and $P_{out}(0)$ is the low level of modulator output power.

For an applied voltage of 2.0 V, for example, the operational bandwidth of the modulator illustrated in FIG. 4 may be approximately 1527 nm to 1557 nm.

Figure 5:
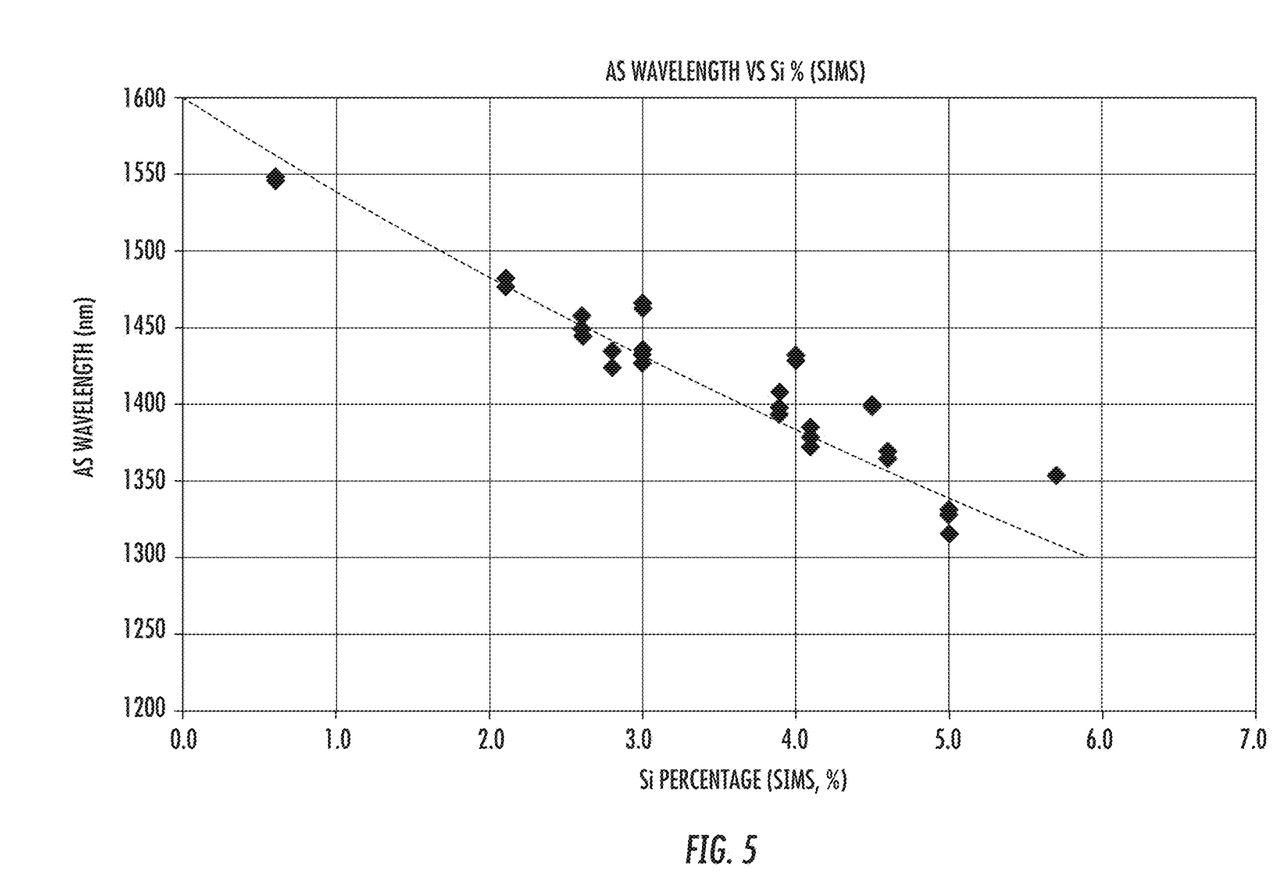
FIG. 5 illustrates absolute absorption spectrum (AS) wavelength of the modulator versus the percentage of silicon in the GeSi according to an example embodiment.

The operating wavelength of the FK modulator can be controlled by changing the silicon composition during the GeSi growth process. With reference to FIG. 5, for example, which shows the absorption spectrum (AS) wavelength of the modulator as a function of the percentage of silicon in the GeSi, the greater the percentage of silicon, the lower the operating wavelength. In FIG. 5, the percentage of silicon in the GeSi is determined via Secondary Ion Mass Spectrometry (SIMS), a destructive method of determining the concentration of different elements in a material.

Figure 6:
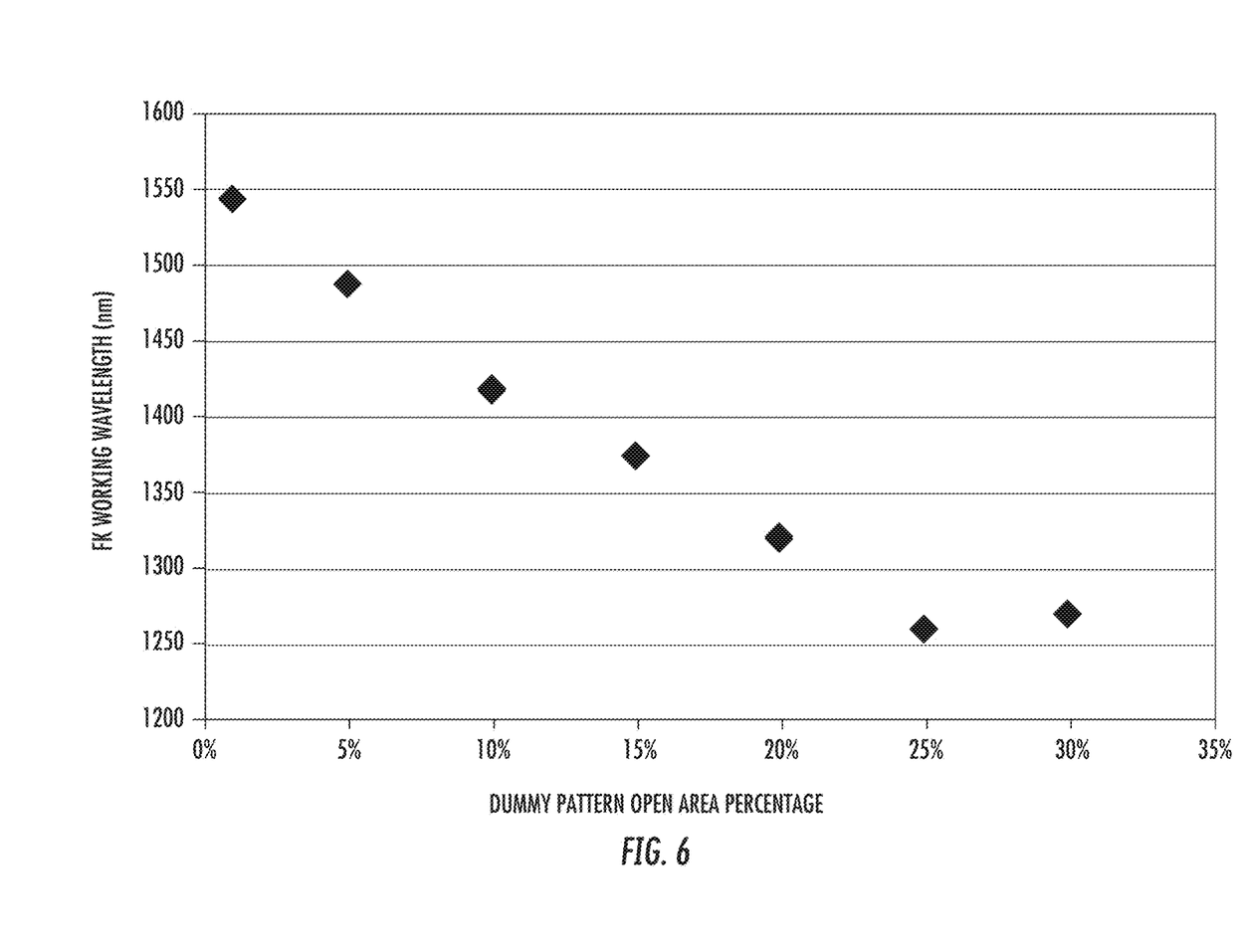
FIG. 6 illustrates the operating wavelength of the FK modulator versus the percentage of the dummy pattern open area according to an example embodiment.

In addition, operating wavelength can further be changed by changing the size or density of open areas within the GeSi material of the modulator during its growth, such as by the addition of dummy structures. With reference to FIG. 6, for example, which shows the operating wavelength of the FK modulator versus the percentage of the dummy pattern open area in the GeSi material, generally speaking, the greater the percentage (more open space), the lower the operating wavelength.

Figure 7A:
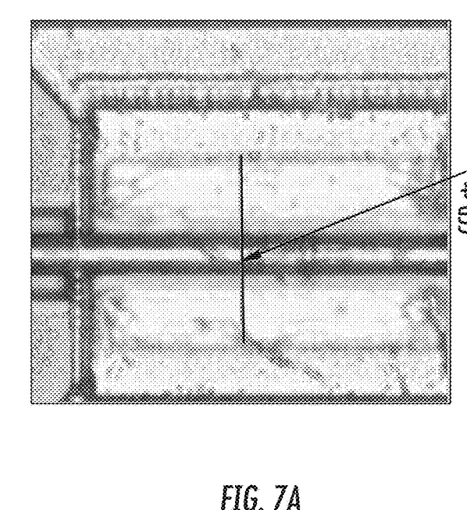
FIG. 7A is a still frame from a video of a scan of a modulator obtained using photoluminescence for determining an absorption spectrum of the modulator according to an example embodiment.
Figure 7B:
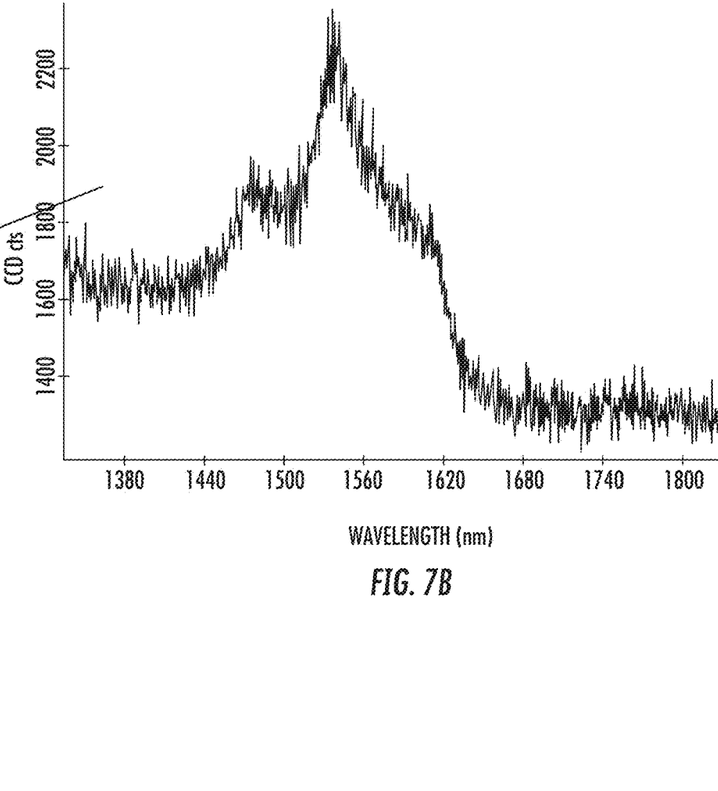
FIG. 7B illustrates a plot illustrating the spectrum of the modulator of FIG. 7A according to an example embodiment.

Accordingly, in some embodiments of the present invention, the absorption spectrum of the modulator may be determined using optical spectroscopy techniques. In particular, in some embodiments, photoluminescence may be used to determine the absorption spectrum of the modulator. Photoluminescence is a phenomenon that is observed when light is emitted from the modulator material after the absorption of photons (electromagnetic radiation). It is initiated by photoexcitation, and following excitation various relaxation processes occur in which other photons are re-radiated. The observation of photoluminescence of the GeSi material at a certain applied energy, according to embodiments of the invention, are thus indicative of the absorption spectrum of the modulator, as the observed photoluminescence wavelengths are indicative of a transition energy of the modulator. As an example, FIG. 7A depicts a still frame from a video of the photoluminescence of the GeSi material at an applied energy, while FIG. 7B illustrates a plot of the counts (cts) from the CCD (Charge Coupled Device), which detects the photoluminescence, against the wavelength (nm) to provide the spectrum of the modulator.

Figure 8:
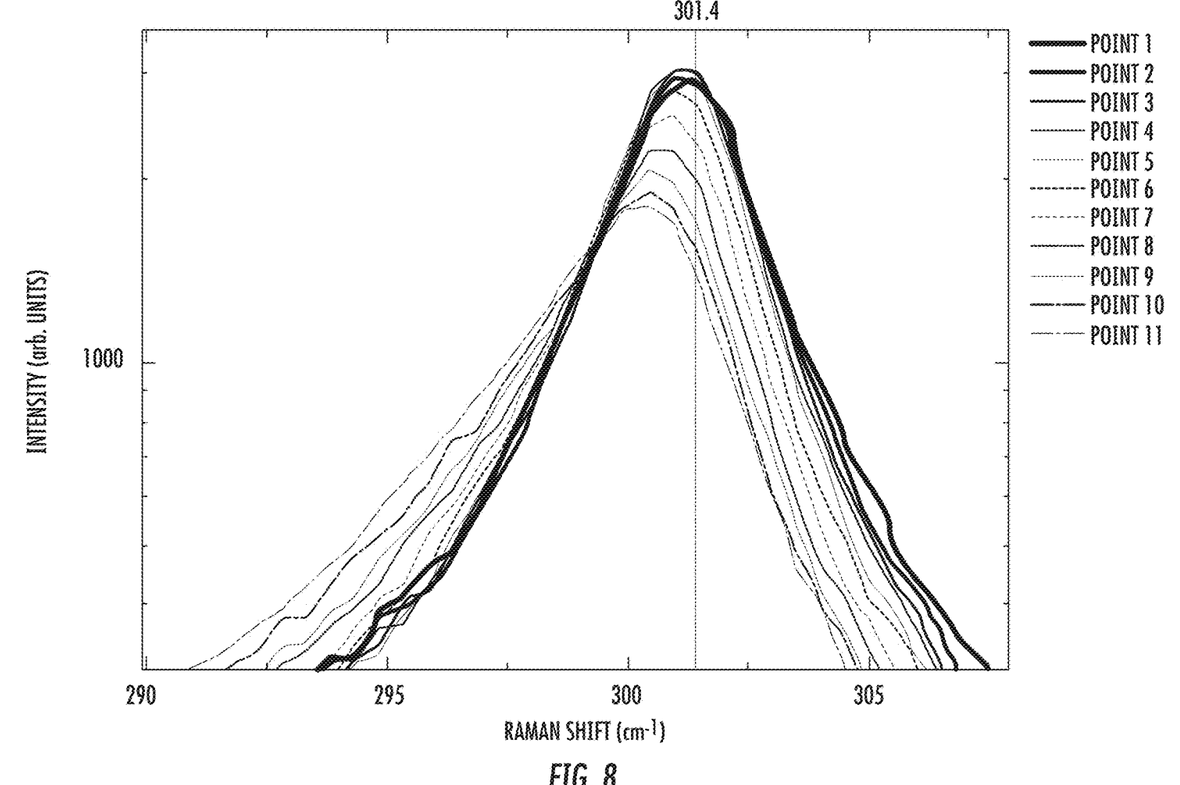
FIG. 8 is a schematic illustration of a scan of a modulator obtained using Raman spectroscopy showing peaks corresponding to an absorption spectrum of the modulator according to an example embodiment.

Additionally or alternatively, Raman spectroscopy may be used to determine the absorption spectrum of the modulator. For example, in some embodiments, the absorption spectrum may be determined by analyzing an intensity at a peak (correlates to composition); width correlates to the stress (width as understood by OSITA) of a scan of the modulator material, where the scan is the result of Raman spectroscopy. An example illustrating the peak of intensity of an absorption spectrum is shown in FIG. 8. In some cases, the absorption spectrum of the modulator is determined using both optical spectroscopy and Raman spectroscopy, and the resulting absorption spectrums from the two techniques may be compared and analyzed to provide for a more accurate determination of the operational bandwidth of the modulator.

A laser may then be selected for coupling with the particular modulator using the operational bandwidth that is determined as described above. For example, a laser (which may in some cases be a VCSEL) may be selected that has an emission bandwidth that corresponds to the operational bandwidth of the modulator. In other words, the laser that has the largest overlapping range of wavelengths with the modulator (when comparing the laser's emission bandwidth with the modulator's operational bandwidth) may be selected for coupling to the modulator in order to provide the optimal operating results when the two are coupled and are in operation. For example, a modulator with an absorption bandwidth of 1510 nm to 1525 nm (such as shown in FIG. 3) may be coupled with a laser having a transmission bandwidth of 1515 nm to 1530 nm, such as a laser tuned to operate at a transmission wavelength of approximately 1520 nm.

Figure 9:
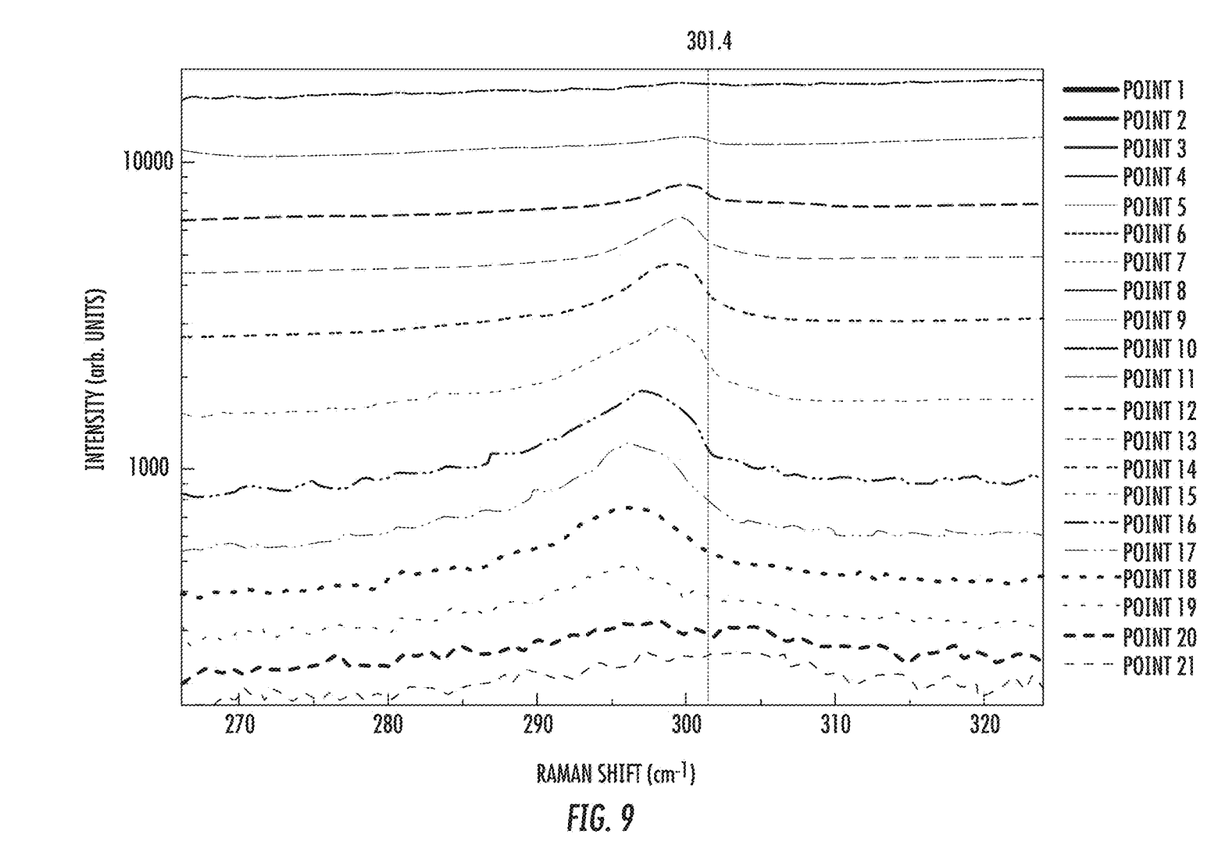
FIG. 9 is a schematic illustration of a scan of a modulator obtained using Raman spectroscopy showing a width of a peak corresponding to a compressive stress of the modulator according to an example embodiment.

In other embodiments, the modulator may be characterized in other ways. For example, in addition to determining the operational bandwidth of the modulator, a compressive stress inherent in the material of the modulator may be determined. In some cases, the compressive stress may be determined by analyzing a width of a peak of the scan of the modulator material, where the scan is obtained using Raman spectroscopy. An example of determining compressive stress using a scan obtained via Raman spectroscopy is shown in FIG. 9, which illustrates a log plot that increases the visibility of the relevant signals. By enlarging the portion of the spectrum where the Ge—Ge scattering peak is visible, it is seen that the peak starts at approximately 300 cm$^{-1}$ and moves toward lower Raman frequency as it approaches the base of the modulator. The solid line in the plot illustrates the bulk Ge reference at 301.4 cm$^{-1}$.

Accordingly, in some embodiments, selecting the laser for coupling with the modulator may comprise selecting a laser that is further compatible with the determined compressive stress of the modulator. For example, the laser, in addition to having an optimal emission spectrum corresponding to the operational bandwidth of the modulator, may further be selected such that the properties of the laser and its output (e.g., the intensity of the emitted light) are not unduly burdensome on the modulator. If, for example, a laser were selected having a very high intensity laser light output in a case where the compressive stress of the modulator is relatively high (inherent from the structure of that particular modulator), the modulator may not operate effectively, or the modulator may experience failure at a faster rate than if a laser with lower intensity laser light output had been selected, such as due to a self-heating effect of the modulator.

Moreover, in some embodiments, other characteristics of the modulator, including a quality of the modulator material and/or material properties of the modulator, may be determined based on the scan obtained via Raman spectroscopy. For example, the quality of the modulator may comprise the amount of Si in the GeSi material, as illustrated in FIG. 5. The material properties of the modulator may include the percentage of cavities or dislocations in the GeSi material, the percentage of impurities in the GeSi material, the existence of other phases of the GeSi material, and/or the existence of competing structures of the GeSi material, as examples. In this regard, the GeSi material may be any GeSi compound, such as GeSiSe or GeSiSn, in which selenium (Se) or tin (Sn), respectively, are added to GeSi to shift it from 1550 nm wavelength to 1310 nm wavelength, which is a function of the phase diagram of GeSiSe and GeSiSn. In this way, a laser may be selected that is compatible with the particular quality of the modulator material and the material properties of the modulator material.

According to the methods and techniques described above, such methods for characterizing the modulator on a given system can be performed during fabrication of a silicon photonics wafers. As such, the optimal laser for coupling and operation with the given modulator may be selected at the manufacturing and fabrication stage, rather than after the silicon photonics wafer has already been built.

Figure 10:
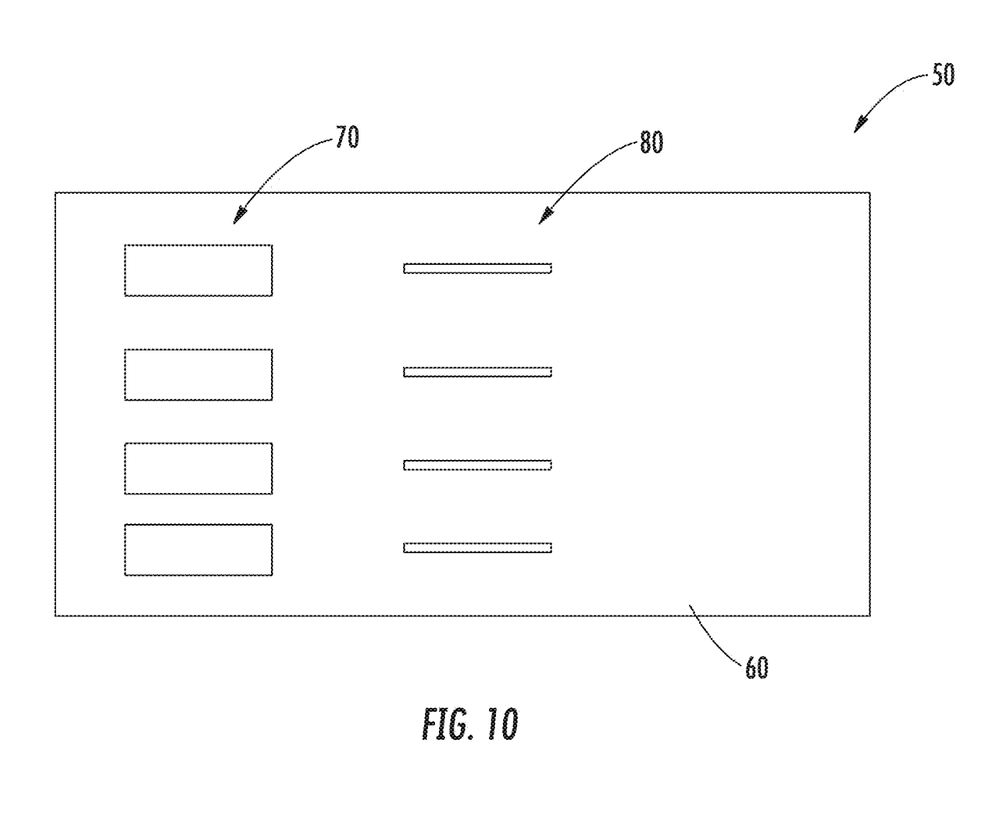
FIG. 10 is a schematic top view illustration of a printed circuit board assembly including a laser selected according to embodiments of the described methods and a modulator according to an example embodiment.

In other embodiments, an apparatus 50 (e.g., a silicon photonics wafer) is described, such as shown in FIG. 10, where the apparatus comprises a printed circuit board assembly 60; a laser 70 (such as a VCSEL) configured to emit an optical signal in response to receiving an electrical signal, wherein the optical signal is configured to be transmitted through a fiber optic cable (not shown); and a modulator 80 (such as an EA modulator) configured to modulate the optical signal. As noted above, the modulator 80 may be a Franz-Keldysh (FK) modulator. The laser 70 may thus be coupled to the modulator, such as when the laser is positioned to emit light through the air and into the modulator material, as shown in FIG. 10.

In this regard, the laser 70 may be selected to have an emission bandwidth that corresponds to an operational bandwidth of the modulator, and the operational bandwidth may be determined based on an absorption spectrum of the modulator. As described above, for example, the absorption spectrum of the modulator may be determined using optical spectroscopy and photoluminescence. Additionally or alternatively, the absorption spectrum of the modulator may be determined via Raman spectroscopy by analyzing an intensity at a peak of a scan of the modulator material obtained using Raman spectroscopy, as described above.

To further enhance the compatibility of the laser 70 with a given modulator 80 and, thereby, optimize the performance of the system, as described above, in some embodiments the selected laser may be compatible with a compressive stress of the modulator 80. The compressive stress of the modulator 80 may be determined by analyzing a width of a peak of a scan of the modulator material obtained using Raman spectroscopy, as described above.

In still other embodiments, the selected laser 70 may be compatible with a quality of the modulator material and material properties of the modulator 80. The modulator material may, in some cases, comprise germanium silicon.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the printed circuit board assembly or otherwise part of the silicon photonics wafer) may also be part of the optoelectronic system. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for characterizing a modulator for fabricating a silicon photonics circuit, the method comprising:
    determining an absorption spectrum of a modulator;
    determining, based at least on the absorption spectrum, an operational bandwidth of the modulator;
    determining a compressive stress of the modulator by analyzing a width of a peak of a scan of the modulator material obtained using Raman spectroscopy; and
    selecting a laser for coupling with the modulator using the operational bandwidth of the modulator,
    wherein the selected laser (a) has an emission bandwidth that corresponds to the operational bandwidth of the modulator and (b) is compatible with the compressive stress of the modulator.

2. The method of claim 1, wherein determining the absorption spectrum of the modulator comprises using optical spectroscopy and photoluminescence.

3. The method of claim 1, wherein determining the absorption spectrum of the modulator comprises using Raman spectroscopy, wherein the absorption spectrum is determined by analyzing an intensity at the peak of the scan of the modulator material obtained using Raman spectroscopy.

4. The method of claim 1, wherein selecting the laser for coupling with the modulator comprises selecting a laser compatible with a quality of the modulator material and material properties of the modulator.

5. The method of claim 1 further comprising determining a quality of the modulator material and material properties of the modulator based on the scan obtained using Raman spectroscopy, wherein selecting the laser for coupling with the modulator comprises selecting a laser compatible with the quality of the modulator material and the material properties of the modulator.

6. The method of claim 1, wherein the modulator is an electro-absorption (EA) modulator.

7. The method of claim 1, wherein the modulator material comprises germanium silicon.

8. The method of claim 1, wherein the method is performed during fabrication of a silicon photonics circuit.

9. The method of claim 1, further comprising based at least on the absorption spectrum, determining a composition of the modulator, wherein the laser is selected for coupling with the modulator based at least in part on the composition of the modulator.

* * * * *